C. E. BRADFORD.
MILK PAIL.
APPLICATION FILED DEC. 26, 1911.
1,040,613.
Patented Oct. 8, 1912.
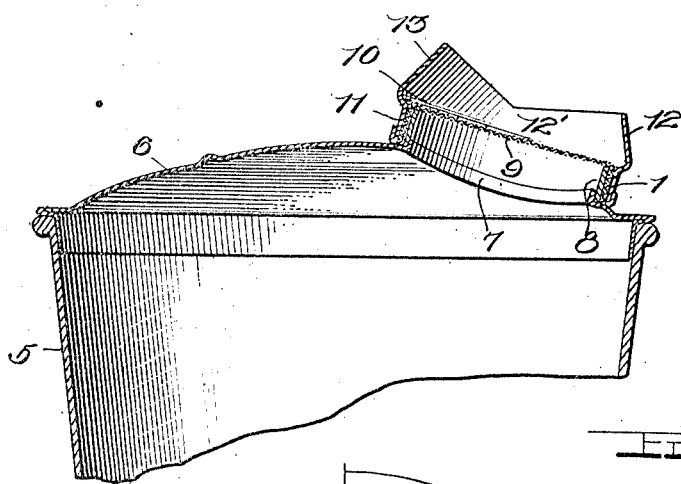
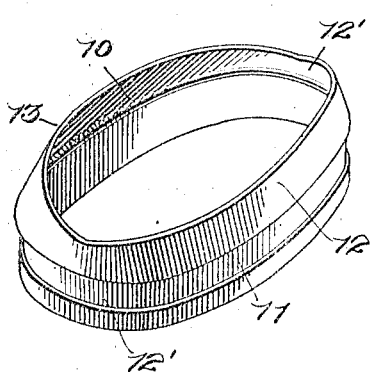
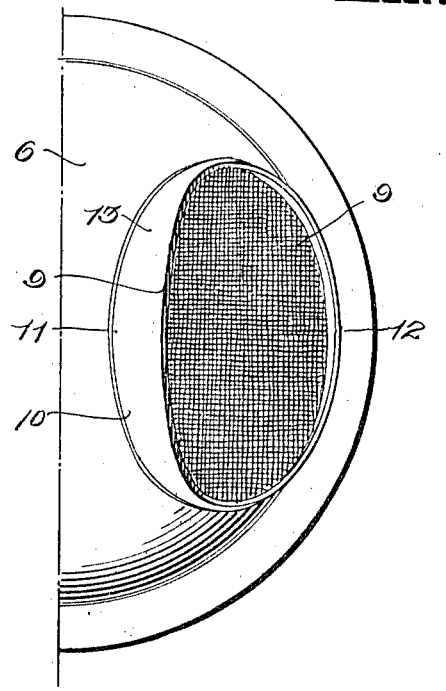
Witnesses
Chas. L. Gieschner.
G. B. Norton.
Inventor
C. E. Bradford
By Watson E. Coleman.
Attorney

UNITED STATES PATENT OFFICE.

CLINTON E. BRADFORD, OF AUGUSTA, WISCONSIN.

MILK-PAIL.

1,040,613.

Specification of Letters Patent.

Patented Oct. 8, 1912.

Application filed December 26, 1911. Serial No. 667,682.

*To all whom it may concern:*

Be it known that I, CLINTON E. BRADFORD, a citizen of the United States, residing at Augusta, in the county of Eau Claire and State of Wisconsin, have invented certain new and useful Improvements in Milk-Pails, of which the following is a specification, reference being had to the accompanying drawings.

This invention relates to certain new and useful improvements in milk pails and has for its primary object to provide an improved cover or top for such pails having an opening therein, and means for removably securing a suitable strainer over said opening.

A further object of the invention is to provide means for effectually preventing the entrance of dirt or other foreign matter into the milk receiving opening of the pail cover and also prevent the spattering of the milk upon the top of the cover and upon the operator, as it strikes the strainer.

A still further object of the invention is to provide a simple, efficient and durable device of this character which will fairly perform the above functions and may also be manufactured at a very small cost.

With the above and other objects in view, the invention consists of the novel features of construction, combination and arrangement of parts hereinafter fully described and claimed, and illustrated in the accompanying drawings, in which—

Figure 1 is a longitudinal section of the upper portion of the pail showing a top or cover thereon embodying my improvements; Fig. 2 is a top plan view; and Fig. 3 is a detail perspective view of the strainer securing member removed.

Referring in detail to the drawing 5 designates a milk pail or receptacle which may be of any approved form and desired size. Upon this pail the cover 6 is adapted to be removably arranged in the usual manner, said cover having an annular flange or rim to engage the wall of the pail. The cover 6 is of concave-convex form as shown and at one side of its center is provided with a substantially elliptical-shaped or elongated opening 7 and to said cover around the edge of said opening the upstanding metal rim or flange 8 is secured. This flange may be soldered or otherwise fixed to the cover wall. A strainer 9 is adapted to be arranged upon the upper edge of this flange 8 over the opening in the pail cover. This strainer may be of cheese cloth or other loosely woven fabric, or wire gauze may be used if desired. The strainer is held in position over the opening 7 in the pail cover by means of the member 10. This member is of the same form in plan as the opening in the cover 6 but is of slightly greater diameter than the upstanding flange 7 which surrounds said opening so that the body portion 11 of the member 10 will fit closely around said flange. Upon one edge of the body 11 of the member 10 an inwardly inclined flange 12 is formed. This flange is gradually reduced in width or tapers at its ends as indicated at 12'. This flange 12 extends for about one-half of the perimetrical extent of the member 10 and a second flange 13 is disposed upon the body 11 of the member 10 and extends upon the remaining portion of its wall. This latter flange, however, is of less width than the flange 12 and is inclined in an opposite direction thereto so that said flanges 12 and 13 are convergently disposed with relation to the walls of the body 11.

In the use of the device, the straining cloth or gauze is arranged over the opening in the cover 6 of the pail and the body wall of the member 10 is then engaged therewith, said member being forced downwardly upon the flange or upstanding wall 8 of the cover to force the cloth or gauze between the outer surface thereof and the inner surface of the body wall 11. The strainer 9 will thus be held tightly in position over said opening in the pail cover. The user places the member 10 upon the wall 8 with the wider flange 12 disposed inwardly, so that the same will be disposed nearest to him when he takes his position for the milking operation. As the milk strikes upon the straining cloth or gauze, it will spatter against the inner face of the flanges 12 and 13 and be drained back upon said strainer so that the loss from this cause is entirely eliminated. The flange 12 also obviates liability of the milk becoming impregnated with dust and dirt, said flange providing a protection for the strainer.

From the foregoing it is believed that the construction and manner of use of my improved pail cover will be fully understood. The device is very simple in construction and will effectually overcome the numerous objections existing in devices of this character now known in the art. The pail is kept in a perfectly sanitary condition and all danger of contamination is avoided. Owing to the simplicity of the device it will further be obvious that the same can be manufactured at small cost and is very durable in practical use. The straining cloth or gauze may be easily and quickly removed and cleansed when necessary and then replaced in position upon the cover.

While I have shown and described the preferred construction and arrangement of the various parts, it will be understood that the invention is susceptible of considerable modification without departing from the essential feature or sacrificing any of the advantages thereof.

Having thus described the invention what is claimed is:—

A milk pail cover having an eccentrically located opening formed therein, said opening being elliptical with its shorter axis coincident with the diameter of the cover, an upstanding flange surrounding said opening, and a removable cloth retaining member of a shape to fit snugly around said flange, whereby to frictionally hold a straining cloth between the retaining member and said flange, said retaining member being formed on both sides of its longer axis with upstanding oppositely disposed and overhanging flanges tapering toward the ends of the retaining member.

In testimony whereof I hereunto affix my signature in the presence of two witnesses.

CLINTON E. BRADFORD.

Witnesses:
  E. M. BRADFORD,
  INEZ C. THWING.